US012794202B2

(12) United States Patent
Platt et al.

(10) Patent No.: US 12,794,202 B2
(45) **Date of Patent: *Nov. 10, 2026**

(54) PRESS FITTING FOR ELECTRICAL CONDUIT

(71) Applicant: Eaton Intelligent Power Limited, Dublin (IE)

(72) Inventors: Joseph E. Platt, Baldwinsville, NY (US); Bradford J. Morse, Syracuse, NY (US); Matthew Pernot, Kirkville, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 19/007,110

(22) Filed: Dec. 31, 2024

(65) Prior Publication Data

US 2025/0337227 A1 Oct. 30, 2025

Related U.S. Application Data

(63) Continuation of application No. 18/298,195, filed on Apr. 10, 2023, now Pat. No. 12,224,563, which is a continuation of application No. 17/383,207, filed on Jul. 22, 2021, now Pat. No. 11,652,339, which is a continuation of application No. 15/692,850, filed on Aug. 31, 2017, now Pat. No. 11,088,515.

(51) Int. Cl.

| | |
|---|---|
| ***H02G 3/06*** | (2006.01) |
| ***F16L 13/14*** | (2006.01) |
| ***F16L 37/091*** | (2006.01) |
| ***H02G 1/08*** | (2006.01) |
| ***H02G 3/22*** | (2006.01) |

(52) U.S. Cl.

CPC ............ *H02G 3/065* (2013.01); *F16L 13/142* (2013.01); *F16L 37/091* (2013.01); *H02G 1/08* (2013.01); *H02G 3/22* (2013.01)

(58) Field of Classification Search

CPC H02G 3/065; H02G 3/22; H02G 3/18; H02G 1/08; H02G 9/06; F16L 37/091; F16L 37/0926; F16L 11/141; F16L 11/143

USPC .................................................. 285/340, 382

See application file for complete search history.

(56) References Cited

U.S. PATENT DOCUMENTS

| | | | | |
|---|---|---|---|---|
| 2,201,372 | A * | 5/1940 | Miller .................. | F16L 37/091 285/340 |
| 6,805,385 | B2 | 10/2004 | Viegener | |
| 6,843,096 | B2 | 1/2005 | Viegener et al. | |
| 7,316,429 | B2 | 1/2008 | Viegener | |
| 7,384,074 | B2 | 6/2008 | He | |
| 7,587,924 | B2 | 9/2009 | Viegener et al. | |
| 7,644,959 | B2 | 1/2010 | Guest | |

(Continued)

FOREIGN PATENT DOCUMENTS

| | | | |
|---|---|---|---|
| EP | 1441165 | A1 | 7/2004 |
| GB | 2471097 | A | 12/2010 |

*Primary Examiner* — Zachary T Dragicevich
(74) *Attorney, Agent, or Firm* — Stinson LLP

(57) ABSTRACT

A method of securing an electrical conduit in an electrical conduit fitting including releasably gripping and removably retaining the electrical conduit in the electrical conduit fitting with a conduit retainer disposed in a passage of the electrical conduit fitting prior to press connecting the electrical conduit fitting to the electrical conduit to fixedly attach the electrical conduit fitting to the electrical conduit.

13 Claims, 14 Drawing Sheets

(56) References Cited

U.S. PATENT DOCUMENTS

| | | | |
|---|---|---|---|
| 7,658,419 | B2 | 2/2010 | Viegener et al. |
| 7,690,693 | B2 | 4/2010 | Moner et al. |
| 7,841,630 | B1 | 11/2010 | Auray et al. |
| 8,202,130 | B2 | 6/2012 | Friese et al. |
| 8,205,915 | B1 | 6/2012 | Crompton et al. |
| 8,274,000 | B2 | 9/2012 | Smith |
| 8,308,201 | B2 | 11/2012 | Duquette et al. |
| 8,474,877 | B2 | 7/2013 | Smith |
| 8,517,431 | B2 | 8/2013 | Arning et al. |
| 8,585,100 | B2 | 11/2013 | Stults et al. |
| 9,234,611 | B2 | 1/2016 | Arning et al. |
| 9,249,907 | B2 | 2/2016 | Mester |
| 9,772,058 | B2 | 9/2017 | Le Quere |
| 10,001,230 | B2 | 6/2018 | Rischen et al. |
| 10,330,231 | B2 | 6/2019 | Meissner |
| 2005/0146133 | A1 | 7/2005 | Snyder et al. |
| 2009/0021001 | A1 | 1/2009 | Oh |
| 2009/0026764 | A1 | 1/2009 | Beckmann et al. |
| 2010/0244436 | A1 | 9/2010 | Mester |
| 2011/0309614 | A1 | 12/2011 | Guest |
| 2012/0001414 | A1 | 1/2012 | Arning et al. |
| 2012/0126526 | A1 | 5/2012 | LeQuere |
| 2012/0161438 | A1 | 6/2012 | Rischen et al. |
| 2012/0174383 | A1 | 7/2012 | Artaud et al. |
| 2013/0082461 | A1 | 4/2013 | Hunter |
| 2015/0276099 | A1 | 10/2015 | Weissmann |
| 2015/0345683 | A1 | 12/2015 | Crompton et al. |
| 2018/0313478 | A1 | 11/2018 | Lawrence et al. |

* cited by examiner

PRESS FITTING FOR ELECTRICAL CONDUIT

CROSS-REFERENCE TO RELATED APPLICATION

The present application is a continuation application of U.S. patent application Ser. No. 18/298,195, which was filed Apr. 10, 2023, which is a \ continuation application of U.S. patent application Ser. No. 17/383,207, which was filed Jul. 22, 2021, issued as U.S. Pat. No. 11,652,339, which is a continuation application of U.S. patent application Ser. No. 15/692,850, which was filed Aug. 31, 2017, issued as U.S. Pat. No. 11,088,515 and which are incorporated herein by reference in their entirety for all purposes.

FIELD OF THE DISCLOSURE

The present disclosure generally relates to a press fitting for an electrical conduit.

BACKGROUND OF THE DISCLOSURE

Electrical conduits are tubes used to protect and route electrical wiring in a building or other structure. Fittings for electrical conduits including, but are not limited to: box connecters used to connect conduit to a junction or other electrical box; couplings, used to connect pieces of electrical conduit to one another when installing a run of conduit; and conduit bodies (e.g., Condulets®) used to connect pieces of electrical conduit to one another to provide pulling access in a run of conduit, to allow more bends to be made in a particular section of conduit, to conserve space where a full size bend radius would be impractical or impossible, and/or to split a conduit run into multiple directions.

SUMMARY OF THE DISCLOSURE

In one aspect, a method of securing an electrical conduit in an electrical conduit fitting generally comprises inserting the electrical conduit into an open end of the electrical conduit fitting such that the electrical conduit is disposed in a passage in the electrical conduit fitting. Releasably gripping and removably retaining the electrical conduit in the electrical conduit fitting with a conduit retainer disposed in the passage of the electrical conduit fitting.

In another aspect, a method of securing an electrical conduit in an electrical conduit fitting generally comprises releasably gripping and removably retaining the electrical conduit in the electrical conduit fitting with a conduit retainer disposed in a passage of the electrical conduit fitting prior to press connecting the electrical conduit fitting to the electrical conduit to fixedly attach the electrical conduit fitting to the electrical conduit.

DETAILED DESCRIPTION OF THE DISCLOSURE

In general, the present disclosure relates to an electrical conduit press fitting—such as but not limited to, a box connector, a coupling, and a conduit body—designed and constructed to be coupled to at least one piece of electrical conduit by a press connection. The press fitting includes at least one of, but not necessarily each of: a conduit retainer for retaining a piece of conduit in the press fitting before press connection; and an alignment structure for axially aligning a piece of conduit in the press fitting before press connection. In one example, the conduit retainer is designed and constructed to include the alignment structure to also perform the alignment function. In another example, the alignment structure is separate from the conduit retainer.

Figure 1:
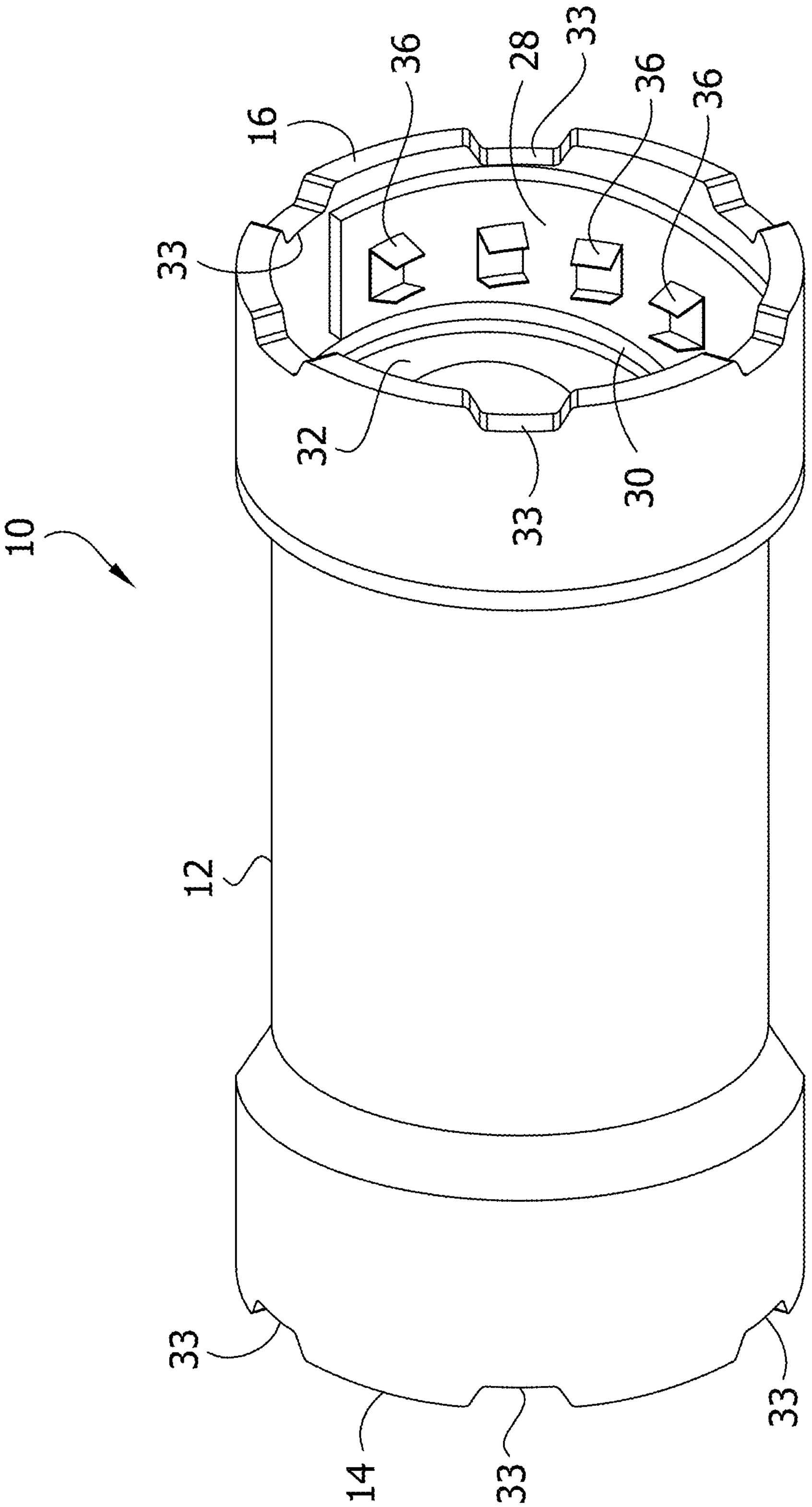
FIG. 1 is a perspective of one embodiment of an electrical conduit fitting constructed according to the teachings of the present disclosure.
Figure 2:
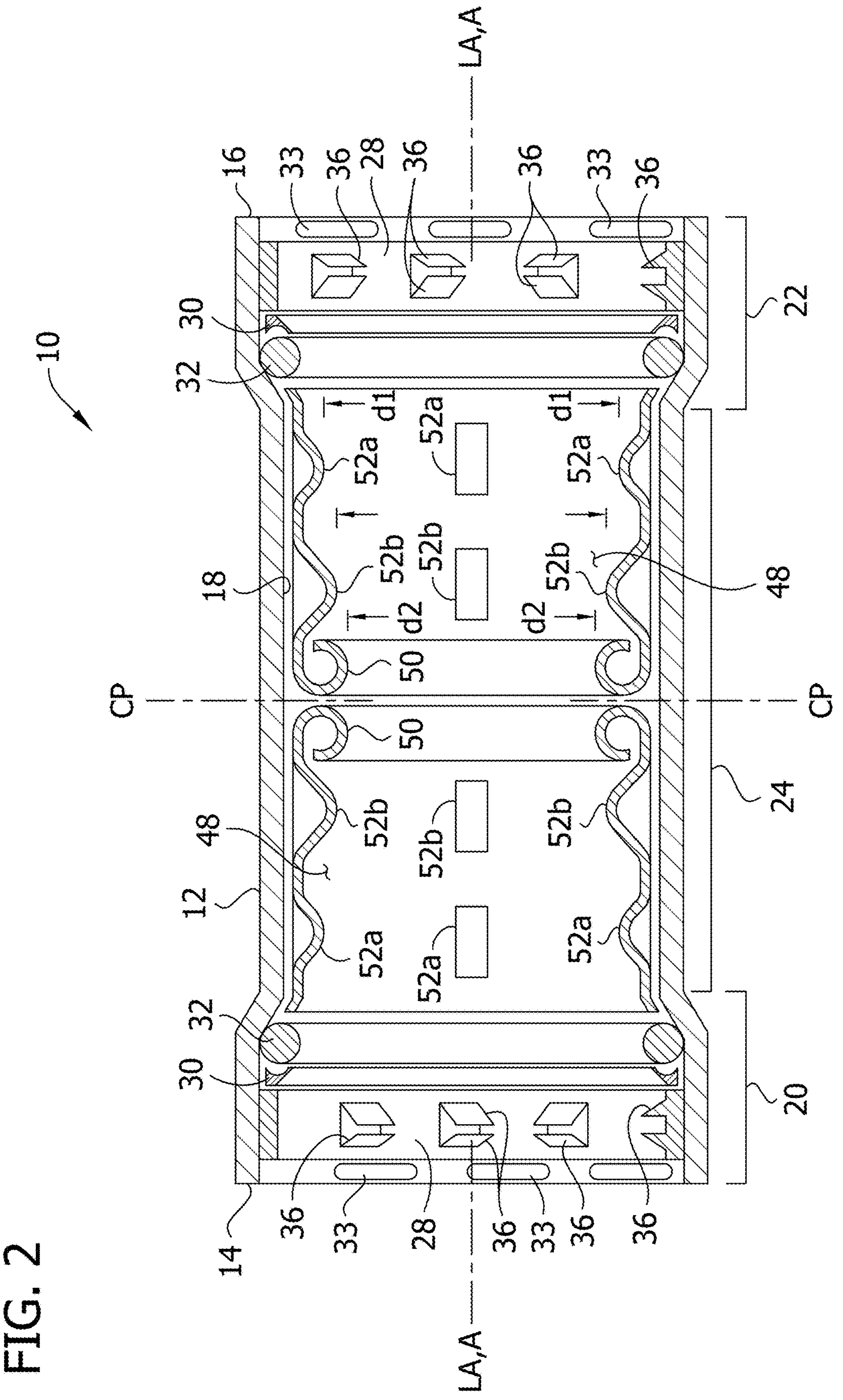
FIG. 2 is a cross section of the fitting.

Referring to FIGS. 1 and 2, one embodiment of an electrical conduit fitting constructed according to the teachings of the present disclosure is generally indicated at reference numeral 10. In general, this electrical conduit fitting 10 is in the form of a coupling designed and constructed to connect pieces of electrical conduit to one another when installing a run of conduit. It is understood that the electrical conduit fitting may be of other types, including but not limited to a box connector and a conduit body, with the teachings set forth herein with respect to the illustrated coupling applying equally to other types of conduit fittings that connect to a piece of electrical conduit by press connection.

Referring still to FIGS. 1 and 2, the electrical conduit fitting 10 includes a generally cylindrical fitting body 12 having opposing first and second open ends 14, 16, and an interior surface 18 defining an internal passage extending axially along a longitudinal axis LA of the fitting body between the first and second open ends thereof. A central transverse plane CP intersects the longitudinal axis LA at a generally orthogonal angle at a mid-length of the body 12. The fitting body 12 includes first and second press-connection sections 20, 22, respectively, adjacent the respective first and second open ends 14, 16, and a central portion 24 disposed between and interconnecting the first and second press-connection sections 20, 22. The press-connection sections 20, 22 have maximum inner and outer diameters that are greater than respective inner and outer diameters of the central portion 24. The press-connection sections 20, 22 have respective transition portions that step down to the decreased inner and outer diameters of the central section 24. The press-connection sections 20, 22 are deformable radially inward to press fit the fitting 10 on the piece of electrical conduit. The fitting body 12 may be formed from metal, such as aluminum, steel, or other metal. The fitting body 12 may be formed from other materials.

Figure 3:
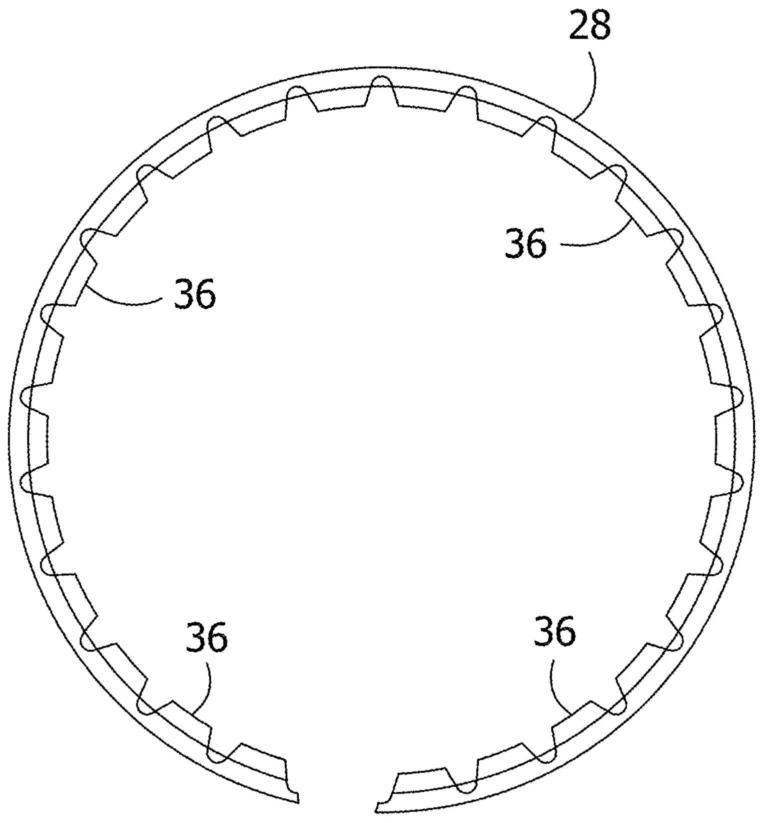
FIG. 3 is an enlarged side elevational view of a press connector of the fitting.

A press connector 28, a separator 30, and a gasket 32 are received in each of the first and second press-connection sections 20, 22 of the fitting body 12. The first and second open ends 14, 16 may include crimped or bent portions to 33 to retain the press connector 28, the separator 30, and the gasket 32 in each of the first and second press-connection sections 20, 22, although the components may be retained in the fitting body 12 in other ways. Each of the press connector 28, the separator 30, and the gasket 32 are generally ring-shaped (e.g., have annular shapes) defining axial openings that are generally axially aligned and generally axially aligned with the longitudinal axis of the fitting body 12. For each press connection section 20, 22, the corresponding press connector 28, separator 30, and gasket 32 are adjacent to one another, with the press connector being axially outward of the gasket relative to the central transverse plane CP and the separator 30 disposed axially between the press connector and the gasket. As shown in FIG. 3, the press-connectors 28 may have an open or discontinuous ring shape. The separator 30 and the gasket 32 may also have this open or discontinuous ring shape.

Each press connector 28 includes a deformable annular body and barbs or teeth 36 (e.g., pairs or sets of barbs) extending radially inward and spaced apart from one another around the radially deformable body. As explained below, the teeth 36 are configured to engage and dig into a piece of conduit inserted into the fitting 10 during a press connection process in which the annular connection body is radially deformed (e.g., radially compressed) to connect the fitting to the piece of conduit. The press connectors 28 may be formed from metal and the teeth may be formed by punching operation or in other ways. Each gasket 32 makes a desired and suitable gas and/or liquid tight seal with the piece of conduit inserted into the fitting 10 during the press connection process. Each gasket 32 may be formed from a suitable polymer, such as rubber, or other material for making a desired and suitable gas and/or liquid tight seal with the piece of conduit inserted into the fitting during the press connection process. Each separator 30 separates the corresponding gasket 32 and press connector 28 so that the press connector does not impinge on the gasket during the press connection process. The separator 30 may include an outer surface generally corresponding with an adjacent surface of the gasket 32. The separator 30 may be formed from metal or other material. It is understood that in one or more embodiments, the fitting 10 may not include one or more of the gasket 32 and the separator 30. Moreover, the press-connectors 28 may be of other configurations for connection to the pieces of electrical conduit.

Figure 4:
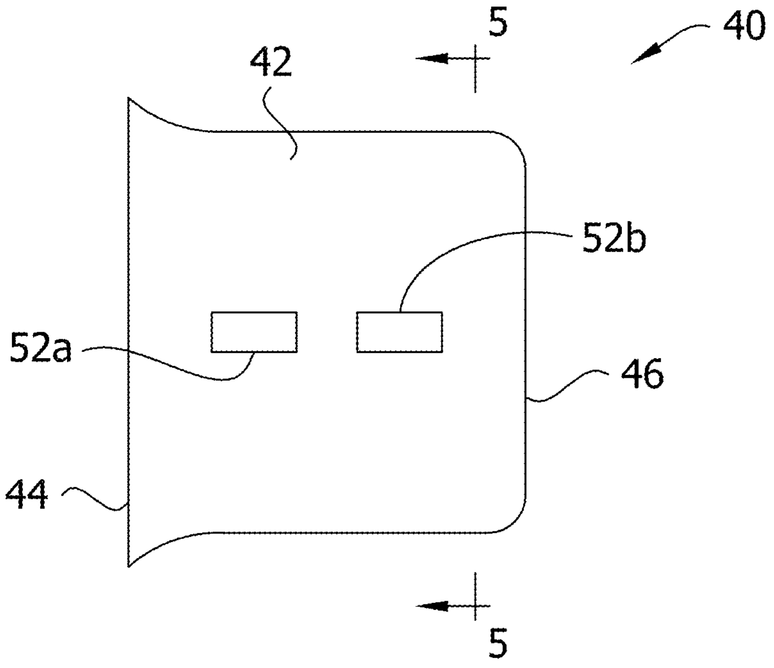
FIG. 4 is an enlarged front elevational view of a conduit retainer of the fitting.
Figure 5:
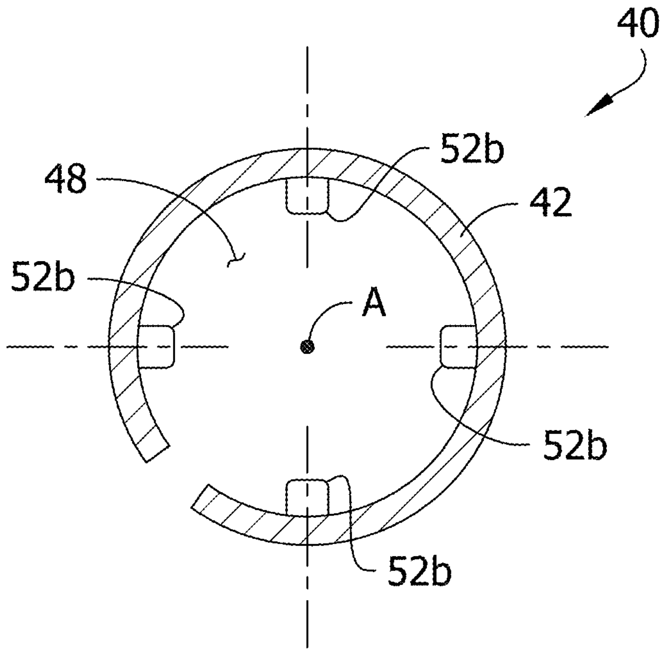
FIG. 5 is a section of the conduit retainer taken in the plane defined by the line 5-5 in FIG. 4.

Referring to FIGS. 2, 4, and 5, the electrical conduit fitting 10 further includes two conduit retainers, each generally indicated at reference numeral 40, received in the passage of the fitting body 12 (e.g., received in the central portion 24). In general, each conduit retainer 40 is configured to grip (e.g., releasably grip) and retain (e.g., removably retain) a piece of electrical conduit inserted in the fitting 10. The conduit retainer 40 is also configured to axially align the piece of electrical conduit within the fitting 10. It is understood that in other embodiments, the fitting may include one conduit retainer 40 or more than two conduit retainers, depending on the type of fitting and its application. In another embodiment, the two conduit retainers 40 may be combined into a single, one-piece component or otherwise connected to one another.

In the illustrated embodiment, the conduit retainers 40 are identical in structure and function. Each conduit retainer 40 includes a generally cylindrical or annular conduit retainer body 42 having first and second open longitudinal ends 44, 46, respectively, and an internal socket 48 extending axially along an axis A of the conduit retainer body between the first and second open longitudinal ends. Each conduit retainer 40 may have an open cylindrical or annular shape, as shown in FIG. 5, for example. The conduit retainers 40 are received in the central portion 24 of the fitting body 12 and are generally arranged in the fitting body 12 as mirror images about the central transverse plane CP, as shown in FIG. 2. In particular, the second longitudinal ends 46 of the conduit retainers 40 adjacent one another (e.g., abut) generally adjacent the central transverse plane CP. The axis of the socket 48 is generally aligned with the longitudinal axis LA of the fitting body 12 and the openings defined by the respective press connectors 28, the separators 30, and the gaskets 32. The first open longitudinal end 44 of each conduit retainer 40 has a flared diameter (e.g., flared inner and outer diameter) sized and shaped to engage an internal shoulder of the fitting body 12 intermediate the respective one of the first and second press-connection sections 20, 22 and the central portion 24. Each conduit retainer 40 may be received in the fitting body 12 as a close clearance fit and captured between the other retainer and the corresponding gaskets 32 or may be received as a press or interference fit. The axis A of the conduit retainer 40 is generally aligned (i.e., coaxial) with the longitudinal axis LA of the fitting body 12. The conduit retainers 40 may be attached to the fitting body 12, such as by adhesive or a mechanical fastener. For reasons explained below, an internal conduit stop 50 at the second open longitudinal end is defined by an inner, annular curl. The conduit retainers 40 may be formed from metal, such as aluminum or steel, or plastic, or other material.

For each conduit retainer 40, at least one detent (e.g., a plurality of first and second detents 52*a*, 52*b*) extends radially inward from the conduit retainer body 42 and toward the axis of the body. In the illustrated embodiment, the conduit retainer 40 includes sets (e.g., pairs) of the detents 52*a*, 52*b*, where the sets are spaced apart from one another around the conduit retainer body 40. Each set includes one of the first detents 52*a* and one of the second detents 52*b*. The detents 52*a*, 52*b* are deflectable (e.g., resiliently deflectable or deformable) in a radially outward direction relative to the axis A of the conduit retainer body 42. The first detents 52*a* have radial dimensions relative to the axis A that are less than the radial dimensions of the second detents 52*b*. Thus, as shown in FIG. 2, the first detents 52*a* are generally aligned circumferentially and define a first effective inner diameter d1 of the conduit retainer 40, and the second detents 52*b* are generally aligned circumferentially and define a second effective inner diameter d2 of the conduit retainer that is less than the first effective inner diameter. The first detents 52*a* are generally adjacent the first longitudinal end 46 and the second detents 52*b* are more adjacent the second longitudinal end 48 so that the effective inner diameter of the conduit retainer 40 tapers or decreases toward the second longitudinal end. As illustrated, this taper is a generally straight taper as shown in cross section; it is understood that in other embodiments the taper may be curvilinear or other shapes in cross section. It is understood that in other embodiments, the one or more detents may define a uniform effective inner diameter that does not taper. The illustrated detents 52*a*, 52*b* are integrally formed with the conduit retainer body 42, although the detents may be formed separate and attached to the conduit retainer body. As an example, the detents 52*a*, 52*b* may be formed by a punching operation. The detents 52*a*, 52*b* may be of other configurations, such as flaps, or barbs, or tabs, or nubs, or springs, or other structures capable of releasably gripping a piece of electrical conduit inserted into the fitting 10.

Figure 6:
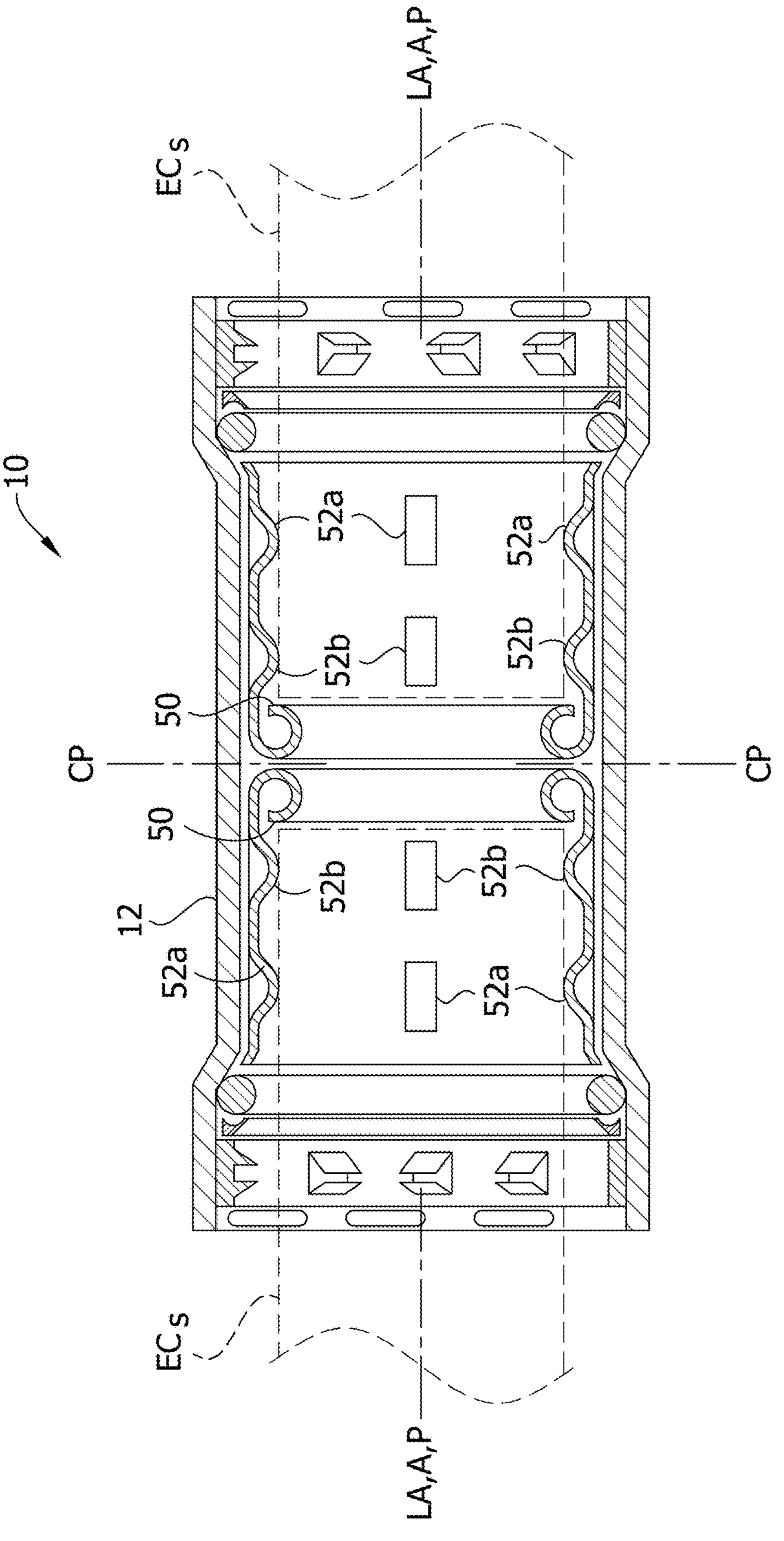
FIG. 6 is similar to FIG. 2, but showing two pieces of straight, non-threaded conduit received in the fitting.
Figure 7:
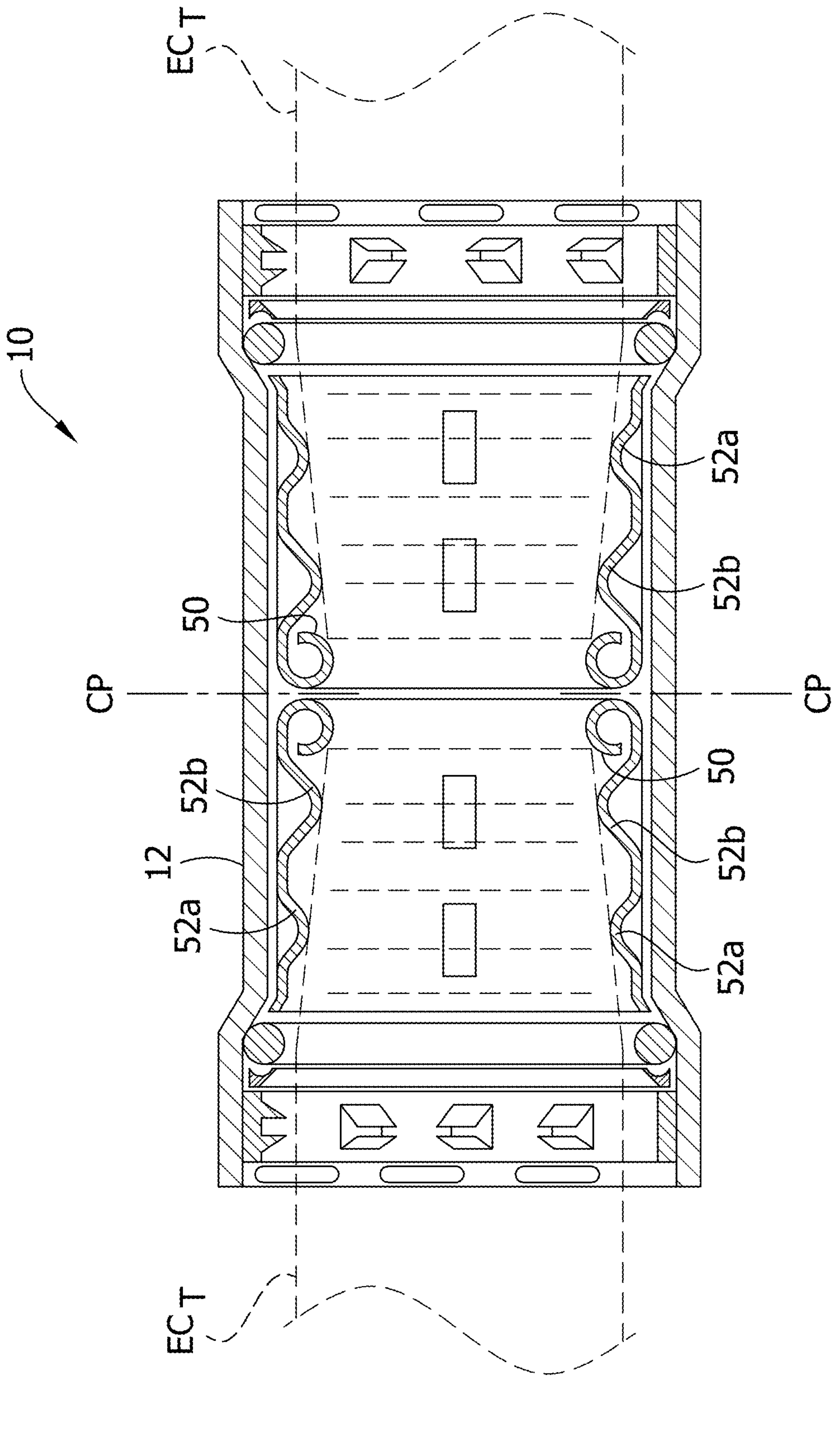
FIG. 7 is similar to FIG. 2, but showing two pieces of NPT threaded conduit received in the fitting.

As shown in FIGS. 6 and 7, the detents are 52*a*, 52*b* are configured to apply a gripping force on a piece of electrical conduit (e.g., both a non-threaded and a threaded electrical conduit) inserted into the fitting 10 and to axially align or center the piece of the electrical conduit in the fitting. In particular, the piece of electrical conduit $EC_S$, $EC_T$ engages the detents 52*a*, 52*b*, causing the detents to resilient deflect (e.g., flatten). This resilient deflection imparts a spring-like gripping force on the piece of electrical conduit $EC_S$, $EC_T$ in the radial direction to hold the piece of electrical conduit in position in the fitting 10. This gripping force may be overcome by applying sufficient withdrawal force on the piece of electrical conduit $EC_S$, $EC_T$ to remove the piece of electrical conduit from the fitting 10 if desired by the user. As can also be seen in FIGS. 6 and 7, the detents 52*a*, 52*b* center or axially align the piece of electrical conduit $EC_S$, $EC_T$ in the fitting 10 (e.g., axis LA of fitting 10 is coaxial or parallel to axis P of conduit). Further, the illustrated detents 52*a*, 52*b* allow the fitting 10 to be used with either the electrical conduit $EC_S$ having a longitudinal end portion with a constant diameter (e.g., a non-threaded conduit) or the electrical conduit $EC_T$ having a tapering longitudinal end portion (e.g., an NPT threaded conduit). This is due to the taper of the effective inner diameter defined by the different detents 52*a*, 52*b*. In other embodiments, the detents 52*a*, 52*b* may not define a taper but may define a uniform effective inner diameter that does not taper.

In use, the conduit retainer 40 retains and centers the piece of electrical conduit $EC_S$, $EC_T$ to aid the user in forming the conduit run, including checking lengths and arrangement of the run, before forming the permanent press connection. The stop 50 in the conduit retainer 40 also facilitates positioning the piece of electrical conduit $EC_S$, $EC_T$ within the fitting 10 so that the user knows depth at which the piece of conduit is inserted into the fitting (which also indicates the distance apart the two pieces of electrical conduit are in the fitting). This maximum depth of insertion and/or distance between the ends of the two pieces of electrical conduit $EC_S$, $EC_T$ can be communicated to the user on the fitting body 12 or elsewhere. The fitting 10 is press connected to the piece of electrical conduit $EC_S$, $EC_T$ using a press tool including jaws that radially press and mechanically deform the press connection sections 14, 16 of the fitting body 12 in a radially inward direction such that the teeth 36 of the press connector 28 engage and dig into the piece of electrical conduit.

Figure 8:
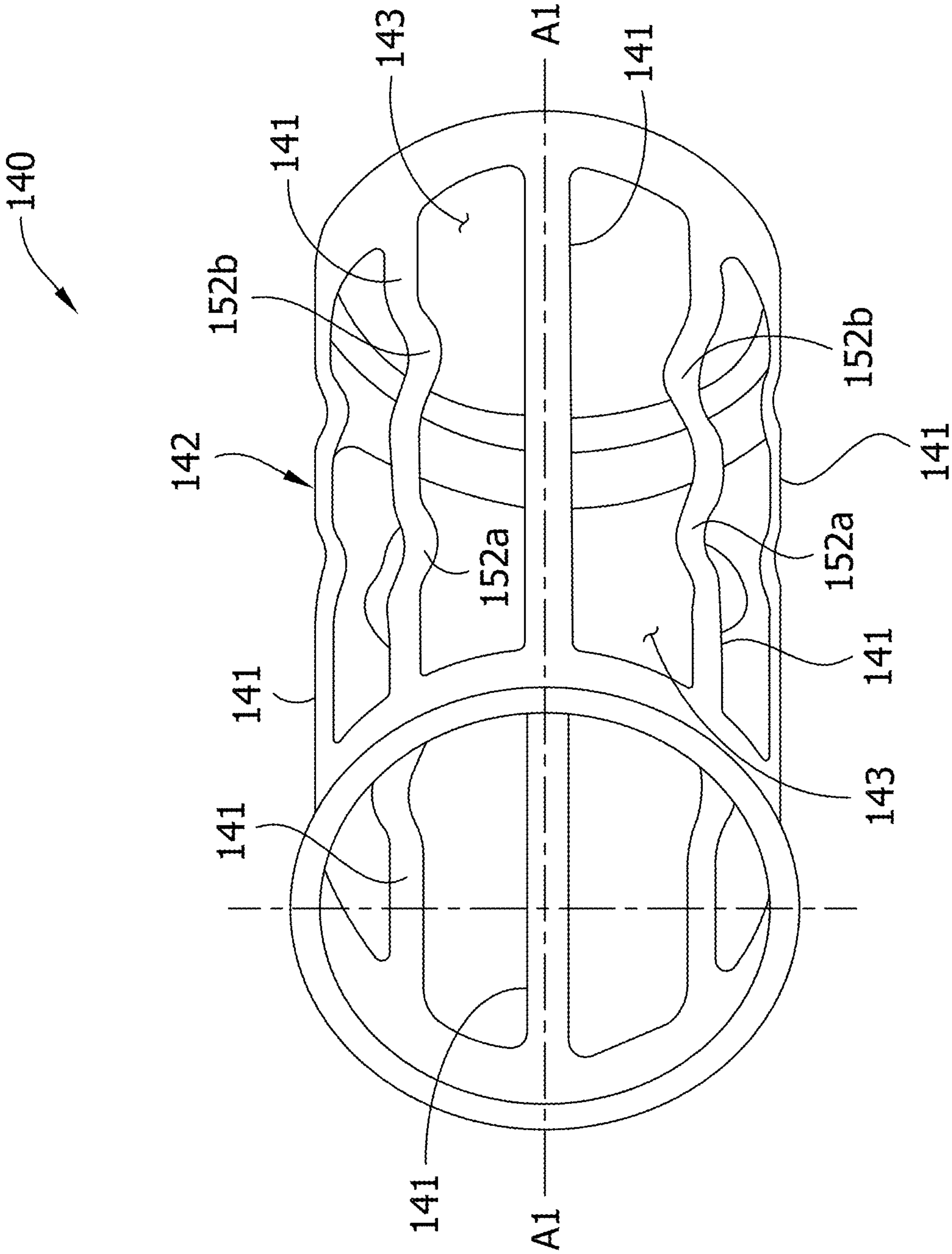
FIG. 8 is a perspective of another embodiment of a conduit retainer.

Referring to FIG. 8, another embodiment of a conduit retainer, similar to the conduit retainer 40, is indicated at reference numeral 140. Unless described hereinafter, this conduit retainer 140 has the same components and functions as the first conduit retainer 40, and therefore, unless explicitly stated, the teachings set forth above with respect to the first conduit retainer apply equally to this conduit retainer. Unlike the first conduit retainer 40, the conduit retainer body 142 of the present conduit retainer 140 includes longitudinal struts 141 extending between an interconnecting the first and second open longitudinal ends 44, 46. The struts 141 are spaced apart from one another around the axis A1 to define slot-shaped openings 143 between the struts. Each strut 141 has one of the sets (e.g., pairs) of the first and second detents 152*a*, 152*b*. Each strut 141 and/or each detent 152*a*, 152*b* is resiliently deflectable radially outward when the piece of electrical conduit $EC_S$, $EC_T$ is inserted into the conduit retainer 140 to imparts a spring-like gripping force on the piece of electrical conduit in the radial direction to hold the piece of electrical conduit in position in the fitting 10, like the first conduit retainer 40. The conduit retainer 140 may be received in the fitting body 12 in the same way as the conduit retainer 40.

Figure 9:
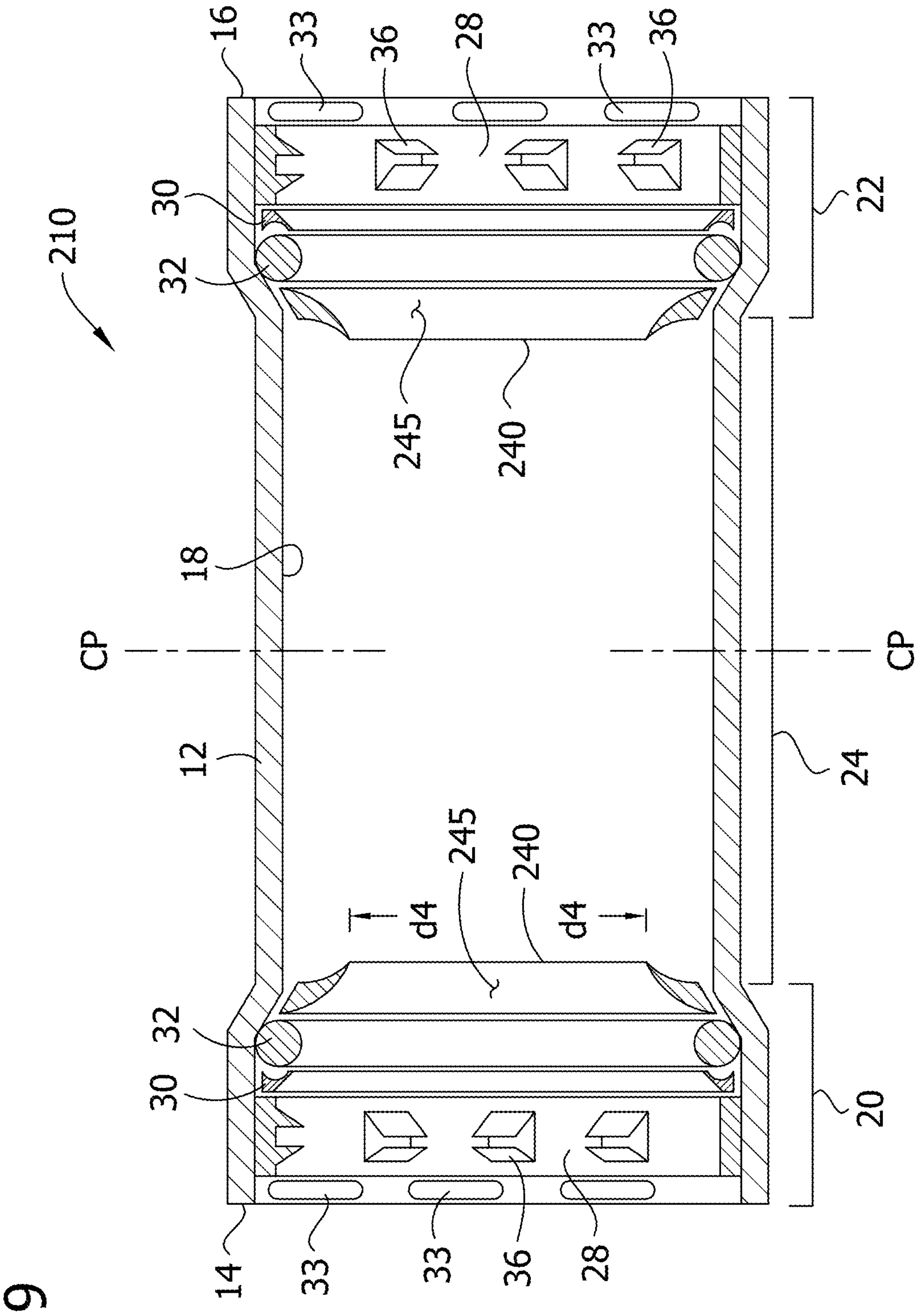
FIG. 9 is a cross section of another embodiment of an electrical conduit fitting constructed according to the teachings of the present disclosure.
Figure 10:
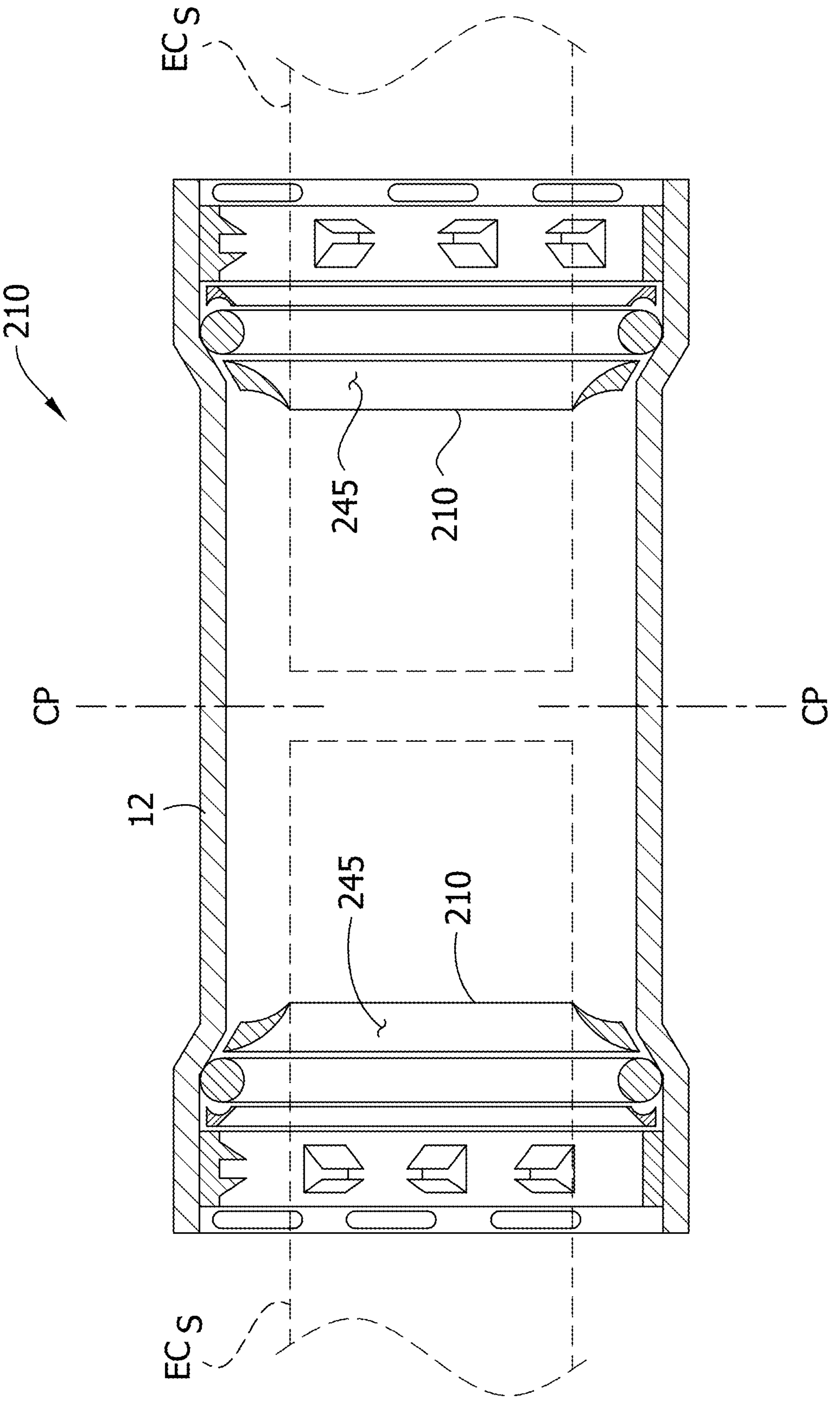
FIG. 10 is similar to FIG. 9, but showing two pieces of straight, non-threaded conduit received in the fitting.

Referring to FIGS. 9 and 10, another embodiment of an electrical conduit fitting is generally indicated at reference numeral 210. Other than the conduit retainer 40, this fitting 210 includes identical component as described above with respect to the first fitting 10. Accordingly, like component are indicated by corresponding reference numerals.

The present fitting 210 includes at least one conduit retainer 240 (e.g., two conduit retainers) configured to grip and retain (e.g., removably retain) a piece of electrical conduit inserted into the fitting 10. Each of the illustrated conduit retainers 240 has a generally annular or ring cross-sectional shape (e.g., an open ring shape) defining a socket 245 for receiving piece of electrical conduit. The opening 245 is generally axially aligned with the openings defined by the gasket 32, the separator 30, and the press connector 28, respectively. A minimum diameter d4 of the opening 245 is less than diameters of the openings defined by the gasket 32, the separator 30, and the press connector 28, respectively. Each conduit retainer 240 is resilient and deflectable to impart a spring-like, releasable gripping force on the piece of electrical conduit in the radial direction to hold the piece of electrical conduit in position in the fitting 210, like the first conduit retainer 40. The conduit retainers 240 may be formed from metal or plastic or other material. The conduit retainers 240 may be captured between the fitting body 12 and the gasket 32 or may be coupled or otherwise fastened in the fitting body in other ways. In another example, one or more separators 30 may include the conduit retainer. For example, the conduit retainer may be an integral component or structure of the separator 30 or may be otherwise connected to the separator.

Figure 11:
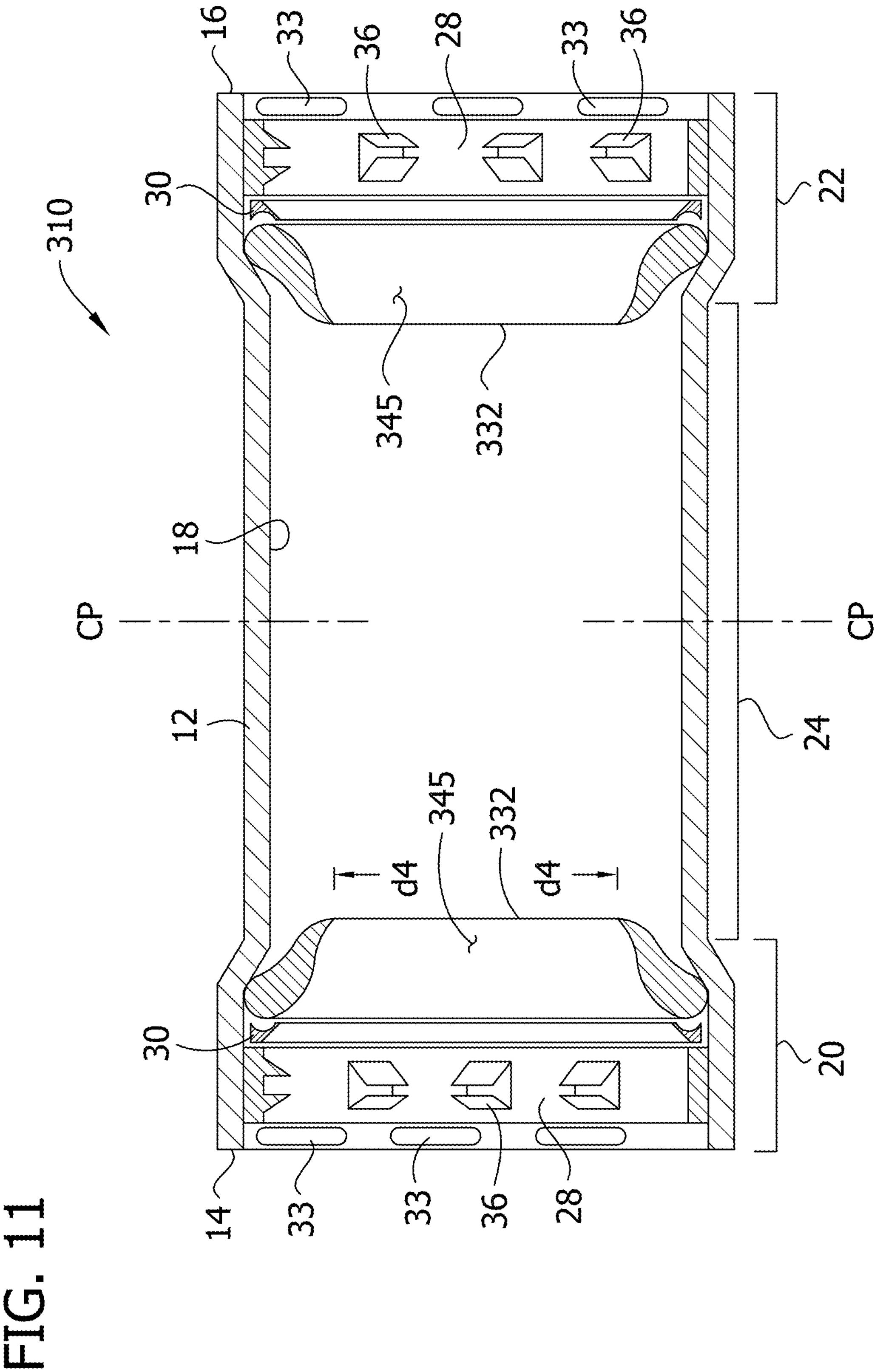
FIG. 11 is a cross section of yet another embodiment of an electrical conduit fitting constructed according to the teachings of the present disclosure.
Figure 12:
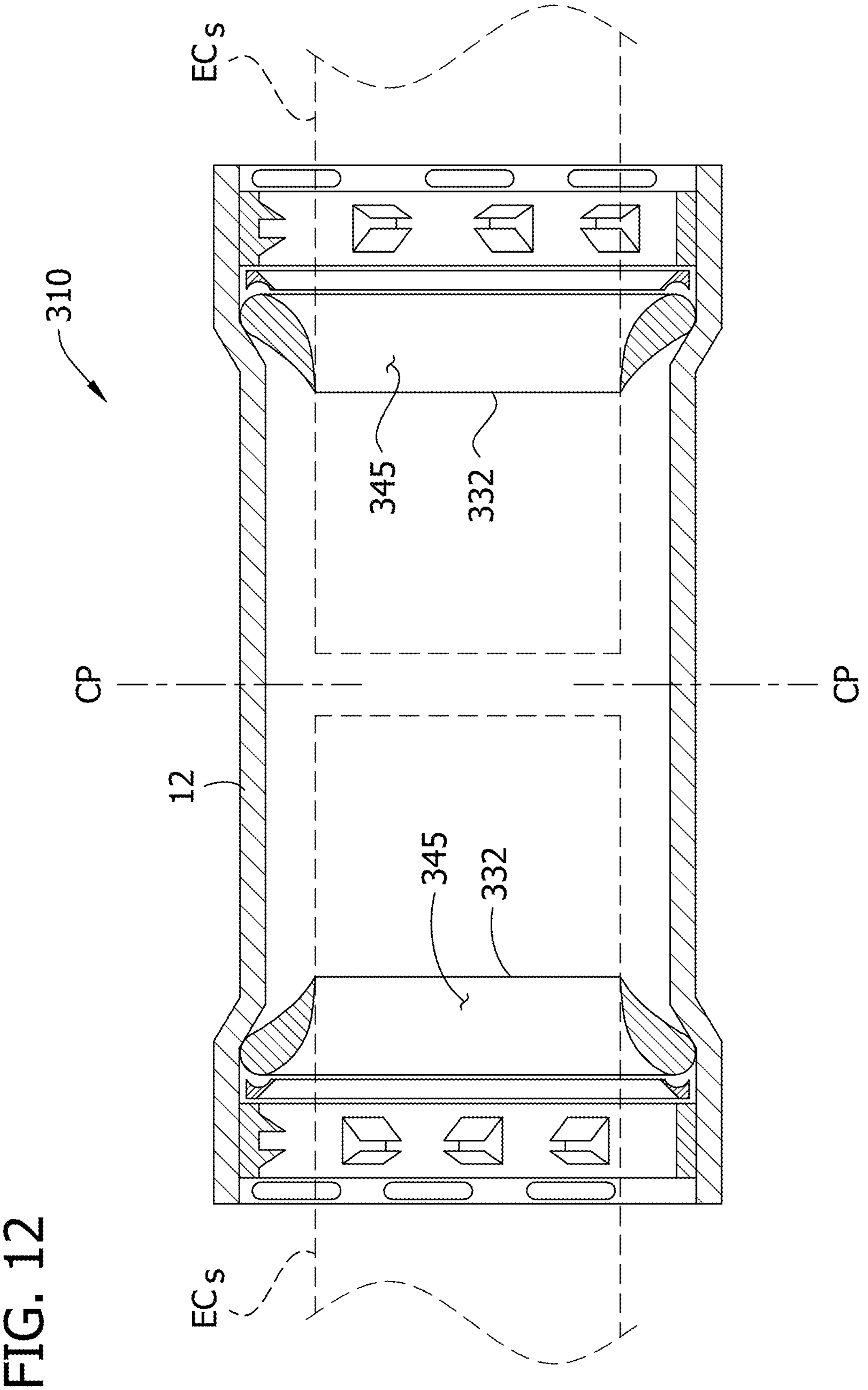
FIG. 12 is similar to FIG. 11, but showing two pieces of straight, non-threaded conduit received in the fitting.

Referring to FIGS. 11 and 12, another embodiment of an electrical conduit fitting is generally indicated at reference numeral 310. Other than the conduit retainer 40 and the gasket 32, this fitting 310 includes identical components as described above with respect to the first fitting 10. Accordingly, like components are indicated by corresponding reference numerals.

Instead of a conduit retainer separate from the gasket, as taught by the first embodiment, the present fitting 310 includes gaskets 332 that also function as conduit retainers configured to grip and retain (e.g., removably retain) a piece of electrical conduit inserted into the fitting 10 in addition to its function as a gasket as set forth above with respect to the gasket 32. Each gasket 332 defines an opening 345 having a reduced minimum diameter d5 that is less than the gasket 32. Each conduit retainer 332 is resilient and deflectable to impart a spring-like, releasable gripping force on the piece of electrical conduit in the radial direction to hold the piece of electrical conduit in position in the fitting 310, like the first conduit retainer 40. The gasket 240 may be formed from plastic or other material.

Figure 13:
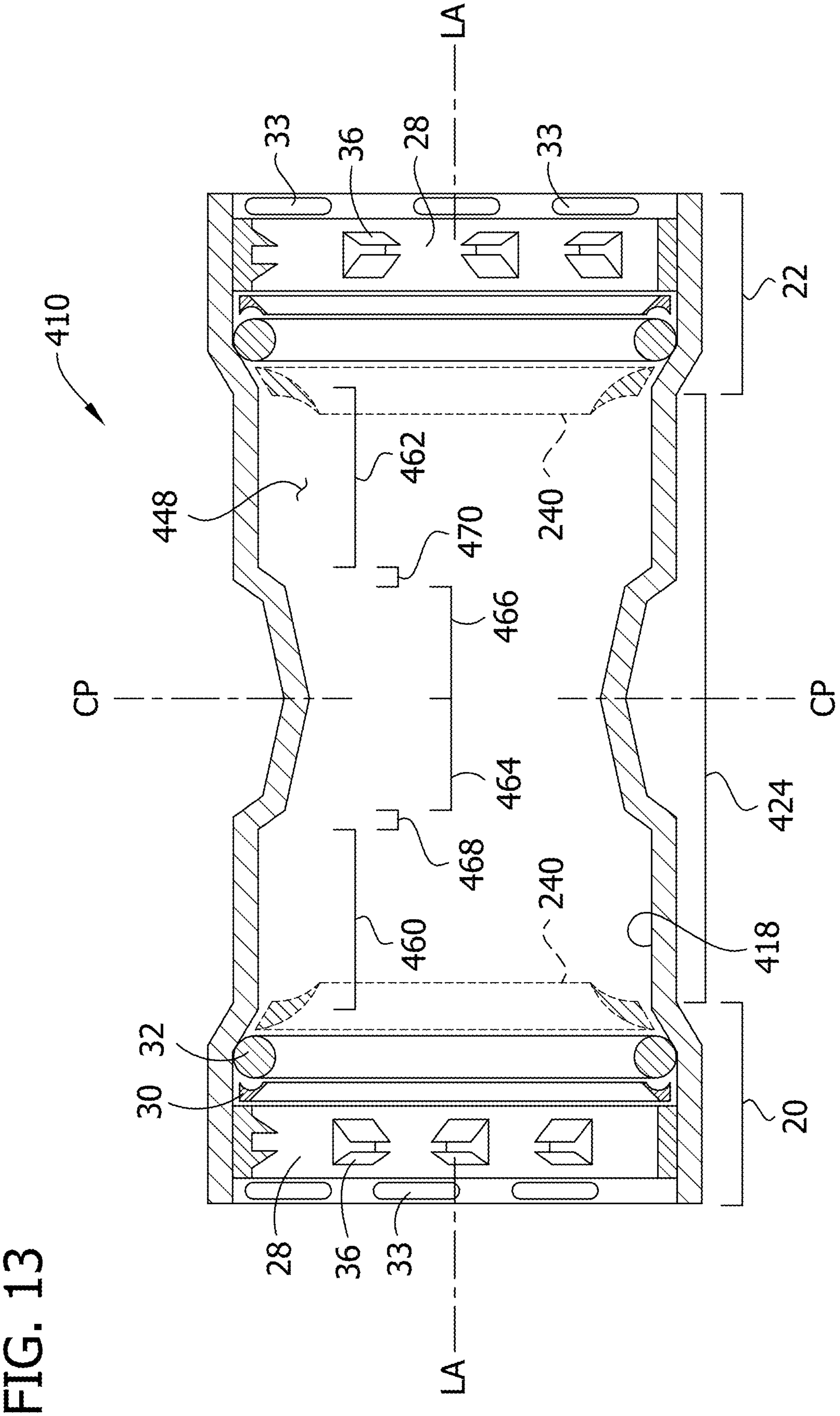
FIG. 13 is a cross section of yet another embodiment of an electrical conduit fitting constructed according to the teachings of the present disclosure.
Figure 14:
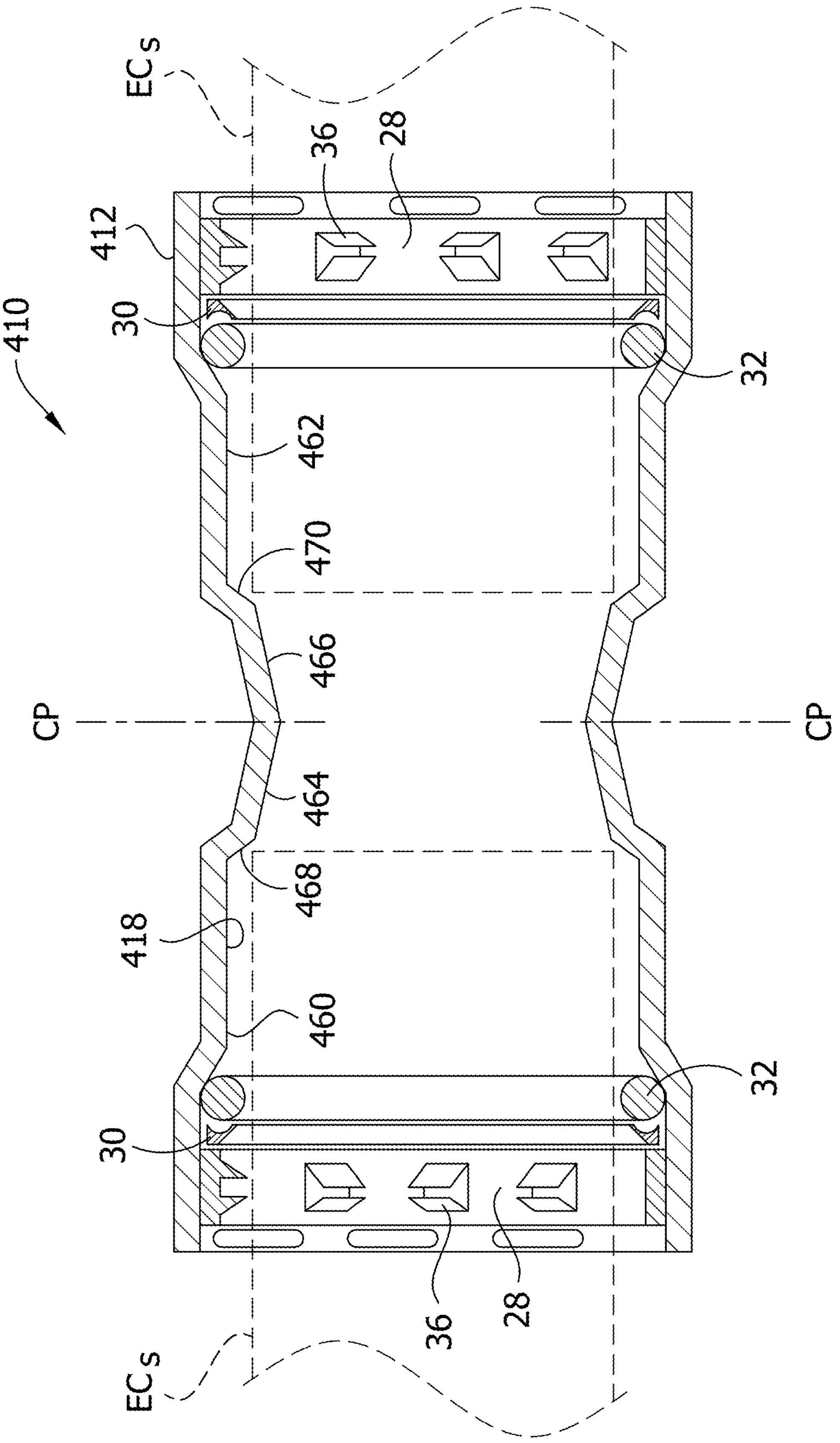
FIG. 14 is similar to FIG. 13, but showing two pieces of straight, non-threaded conduit received in the fitting.
Figure 15:
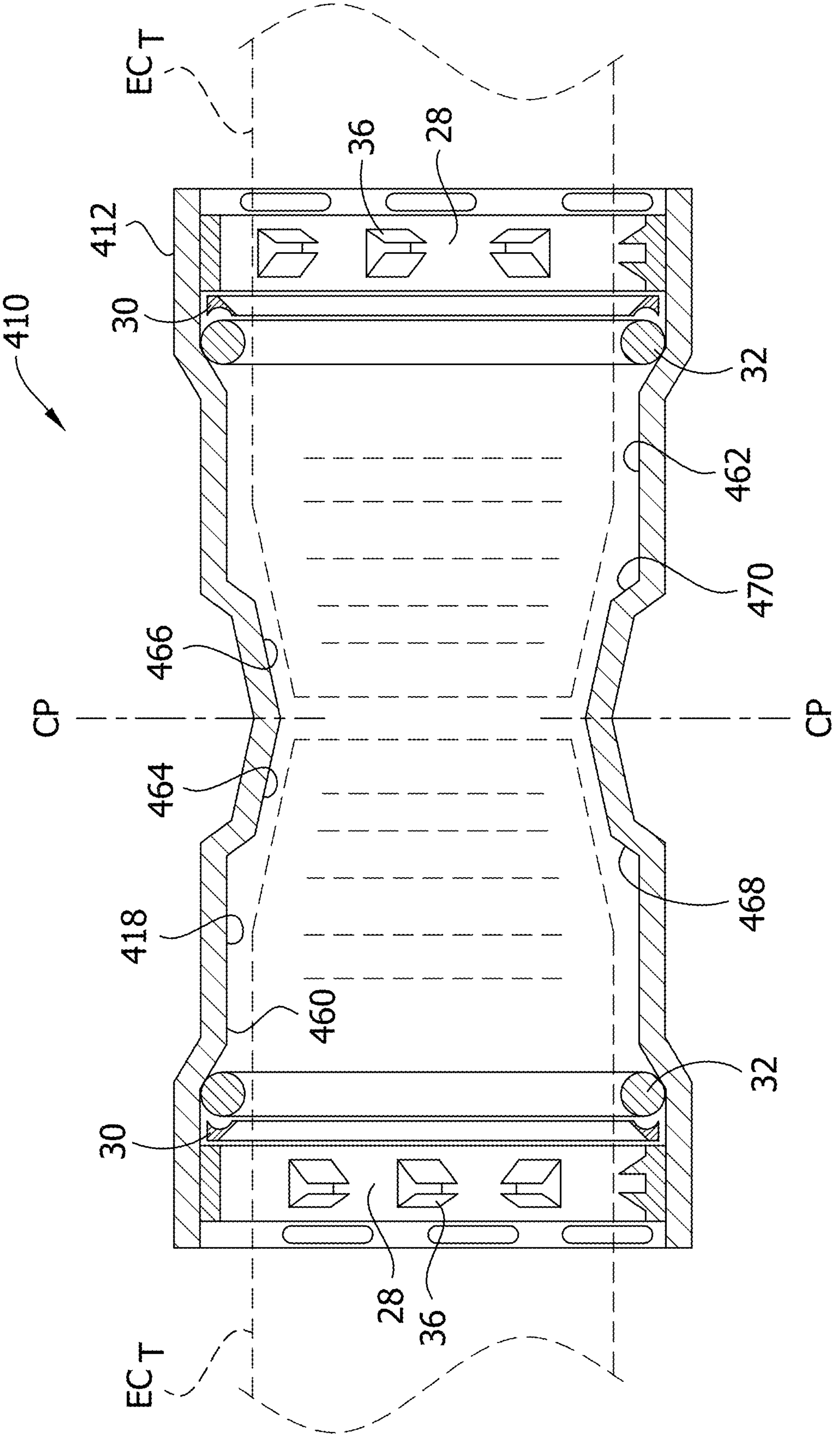
FIG. 15 is similar to FIG. 13, but showing two pieces of NPT threaded conduit received in the fitting.

Referring to FIGS. 13-15, another embodiment of an electrical conduit fitting is generally indicated at reference numeral 410. Other than the fitting body 12, this fitting 410 includes identical components as described above with respect to the fitting 210 described in reference to FIGS. 9 and 10. Accordingly, like components are indicated by corresponding reference numerals. FIG. 13 illustrates the fitting 410 as including the conduit retainer 210, with the understanding that the conduit retainer 240 may be omitted without necessarily departing from the scope of the present invention, as shown in FIGS. 14 and 15. Moreover, a different type of conduit retainer, such as a conduit retainer constructed according to the teachings of the conduit retainer 40, may be utilized.

The present fitting 10 includes a fitting body 412 having a central portion 424 with a non-uniform inner cross-sectional dimension (e.g., a non-uniform inner diameter) defining an internal socket 448. The outer cross-sectional dimension (e.g., the outer diameter) is also non-uniform, although it may be uniform in some embodiments. The interior surface 418 of the central portion 424 of the fitting body 412 includes: opposite first and second axially outer sections, 460, 462 adjacent the respective first and second press-connection portions 20, 22; first and second axially inner sections 464, 466, juxtaposed to one another and between the first and second axially outer sections; a first transition portion 468 disposed between and interconnecting the first axially outer section 460 and the first axially inner section 464; and a second transition portion 470 disposed between and interconnecting the second axially outer section 462 and the first axially inner section 466. (As used here, the terms "axially inner" and "axially outer" are relative terms in reference to the center transverse plane CP.) The illustrated embodiment shows the fitting body 412 as being formed as an integral, one-piece component.

The axially outer sections 460, 462 each define generally uniform inner diameter of the fitting body 412 is greater than an outer maximum diameter of either one of the electrical conduit $EC_S$ having a longitudinal end portion with a constant diameter (e.g., a non-threaded conduit) or the electrical conduit $EC_T$ having a tapering longitudinal end portion (e.g., an NPT threaded conduit). Accordingly, as shown in FIGS. 14 and 15, the pieces of electrical conduit $EC_S$, $EC_T$ are insertable into the portions of the fitting body 412 defined by the axially outer sections 460, 462. The axially outer sections 460, 462 may facilitate centering of the electrical conduit $EC_S$.

The transition portions 468, 470 abruptly extend radially inward toward the longitudinal axis LA to define shoulders (or stops) such that the transitions portions define an inner diameter of the fitting body 412 that is less than the inner diameter at the axially outer sections 460, 462. As shown in FIG. 14, the minimum inner diameters of the fitting body at the transition portions are less than the outer diameter of the electrical conduit $EC_S$ having a longitudinal end portion with a constant diameter such that the piece of electrical conduit $EC_S$ engages the transition portion 468, 470 and is inhibited from further insertion toward the central transverse plane CP. The locations of the stops may be at a predetermined distance from the central transverse plane CP, which is communicated to the user, so that the user is aware of the spacing between the two pieces of electrical conduit when the two pieces are received in the fitting body 412.

The axially inner sections 464, 466 taper inward toward the longitudinal axis LA from the respective transition portions 468, 470 to the central transverse plane CP. The taper of the axially inner sections 464, 466 generally corresponds to the taper of the end of the NPT threaded conduit such that the axially inner sections center the NPT threaded conduit in the fitting body 412. The taper of the axially inner sections 464, 466 may also inhibit the NPT threaded conduit from being inserted past the central transverse plane CP. The interior surface 418 adjacent the junction of the axially inner sections 464, 466 may be rounded or smoothed to inhibit damaging electrical wires passing over the interior surface.

In other embodiments, an insert of the fitting body 412 may be used to define the socket 448 having a non-uniform (e.g., tapering) cross section. For example, inner diameter of the wall of the fitting body may be uniform and an insert having a non-uniform, tapering inner diameter defining the socket 448 may be inserted into the passage defined by the wall of the fitting body.

Each embodiment of the electrical conduits described herein may be designed and configured to meet the standards set forth in UL 514B.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A press fitting for an electrical conduit comprising:

a fitting body having first and second open ends, and an interior surface defining a passage adapted to receive a piece of the electrical conduit therein, the fitting body including a press-connection section that is deformable radially inward during a press connection process and a conduit retainer section defining an inner dimension that is smaller than an inner dimension of the press-connection section;

a conduit retainer in the passage at the conduit retainer section of the fitting body, the conduit retainer configured to releasably grip and removably retain the piece of electrical conduit in the fitting body before the press-connection section is deformed radially inward during the press connection process;

wherein the conduit retainer includes at least one detent adapted to engage the piece of electrical conduit in the fitting body to releasably grip and removably retain the piece of electrical conduit in the fitting body;

wherein the conduit retainer includes an internal stop configured to inhibit the piece of electrical conduit from extending past the internal stop.

2. The press fitting set forth in claim 1, wherein the at least one detent is resiliently deflectable upon engagement with the piece of electrical conduit in the fitting body.

3. The press fitting set forth in claim 2, wherein the at least one detent includes a plurality of detents.

4. The press fitting set forth in claim 3, wherein the conduit retainer has a generally cylindrical shape having opposite first and second open longitudinal ends, a longitudinal socket for receiving the piece of electrical conduit, and an axis extending through the longitudinal socket between the first and second open longitudinal ends.

5. The press fitting set forth in claim 4, wherein the detents comprise first detents and second detents, wherein the first detents define a first effective inner diameter of the conduit retainer, and wherein the second detents define a second effective inner diameter of the conduit retainer that is less than the first effective inner diameter.

6. The press fitting set forth in claim 1, wherein the conduit retainer comprises an annular body.

7. The press fitting set forth in claim 1, wherein the conduit retainer includes a plurality of conduit retainers.

8. The press fitting set forth in claim 1, further comprising a gasket in the press-connection section of the fitting body configured to seal with the piece of electrical conduit when the press-connection section is deformed radially inward during the press connection process and further comprising a separator in the press-connection section of the fitting body configured to separate the gasket and the press connector.

9. The press fitting set forth in claim 1, wherein the conduit retainer comprises two conduit retainers arranged as mirror images about a central transverse plane of the fitting body.

10. The press fitting set forth in claim 1, wherein the conduit retainer includes at least one detent adapted to engage the piece of electrical conduit in the fitting body to releasably grip and removably retain the piece of electrical conduit in the fitting body, and at least a portion of the conduit retainer section of the fitting body has a cross-sectional diameter that tapers in a direction away from the press-connection section, and the conduit retainer section of the fitting body has a uniform section adjacent the press-connection section and having a uniform cross-sectional diameter, said portion of the conduit retainer section comprising a tapering section having a cross-sectional diameter that tapers, and wherein the conduit retainer section of the fitting body has a transition section disposed between and interconnecting the uniform and tapering sections, the transition section defines a stop to limit insertion of the piece of electrical conduit into the socket, and wherein the press-connection section has an inner cross-sectional diameter that it greater than the uniform cross-sectional diameter and the tapering cross-sectional diameter of the conduit retainer section of the fitting body.

11. The press fitting set forth in claim 1, wherein the conduit retainer includes at least one detent adapted to engage the piece of electrical conduit in the fitting body to releasably grip and removably retain the piece of electrical conduit in the fitting body, and at least a portion of the conduit retainer section of the fitting body has a cross-sectional diameter that tapers in a direction away from the press-connection section, and the conduit retainer section of the fitting body has a uniform section adjacent the press-connection section and having a uniform cross-sectional diameter, said portion of the conduit retainer section comprising a tapering section having a cross-sectional diameter that tapers, and wherein the conduit retainer section of the fitting body has a transition section disposed between and interconnecting the uniform and tapering sections, the transition section defines a stop to limit insertion of the piece of electrical conduit into the socket, and further comprising a gasket in the press-connection section of the fitting body configured to seal with the piece of electrical conduit when the press-connection section is deformed radially inward during the press connection process.

12. A press fitting for an electrical conduit comprising:

a fitting body having first and second open ends, and an interior surface defining a passage adapted to receive a piece of the electrical conduit therein, the fitting body including a press-connection section that is deformable radially inward during a press connection process and a conduit retainer section defining an inner dimension that is smaller than an inner dimension of the press-connection section;

a conduit retainer in the passage at the conduit retainer section of the fitting body, the conduit retainer configured to releasably grip and removably retain the piece of electrical conduit in the fitting body before the press-connection section is deformed radially inward during the press connection process;

wherein the conduit retainer includes at least one detent adapted to engage the piece of electrical conduit in the fitting body to releasably grip and removably retain the piece of electrical conduit in the fitting body;

a gasket in the press-connection section of the fitting body configured to seal with the piece of electrical conduit when the press-connection section is deformed radially inward during the press connection process.

13. A press fitting for an electrical conduit comprising:

a fitting body having first and second open ends, and an interior surface defining a passage adapted to receive a piece of the electrical conduit therein, the fitting body including a press-connection section that is deformable radially inward during a press connection process and a conduit retainer section defining an inner dimension that is smaller than an inner dimension of the press-connection section;

a conduit retainer in the passage at the conduit retainer section of the fitting body, the conduit retainer configured to releasably grip and removably retain the piece of electrical conduit in the fitting body before the press-connection section is deformed radially inward during the press connection process;

wherein the conduit retainer includes at least one detent adapted to engage the piece of electrical conduit in the fitting body to releasably grip and removably retain the piece of electrical conduit in the fitting body;

wherein at least a portion of the conduit retainer section of the fitting body has a cross-sectional diameter that tapers in a direction away from the press-connection section;

wherein the conduit retainer section of the fitting body has a uniform section adjacent the press-connection section and having a uniform cross-sectional diameter, said portion of the conduit retainer section comprising a tapering section having a cross-sectional diameter that tapers; and wherein the conduit retainer section of the fitting body has a transition section disposed between and interconnecting the uniform and tapering sections, wherein the transition section defines a stop to limit insertion of the piece of electrical conduit into the socket.

* * * * *